(No Model.) 2 Sheets—Sheet 1.
H. C. WOLWORTH.
BEEHIVE.
No. 510,751. Patented Dec. 12, 1893.
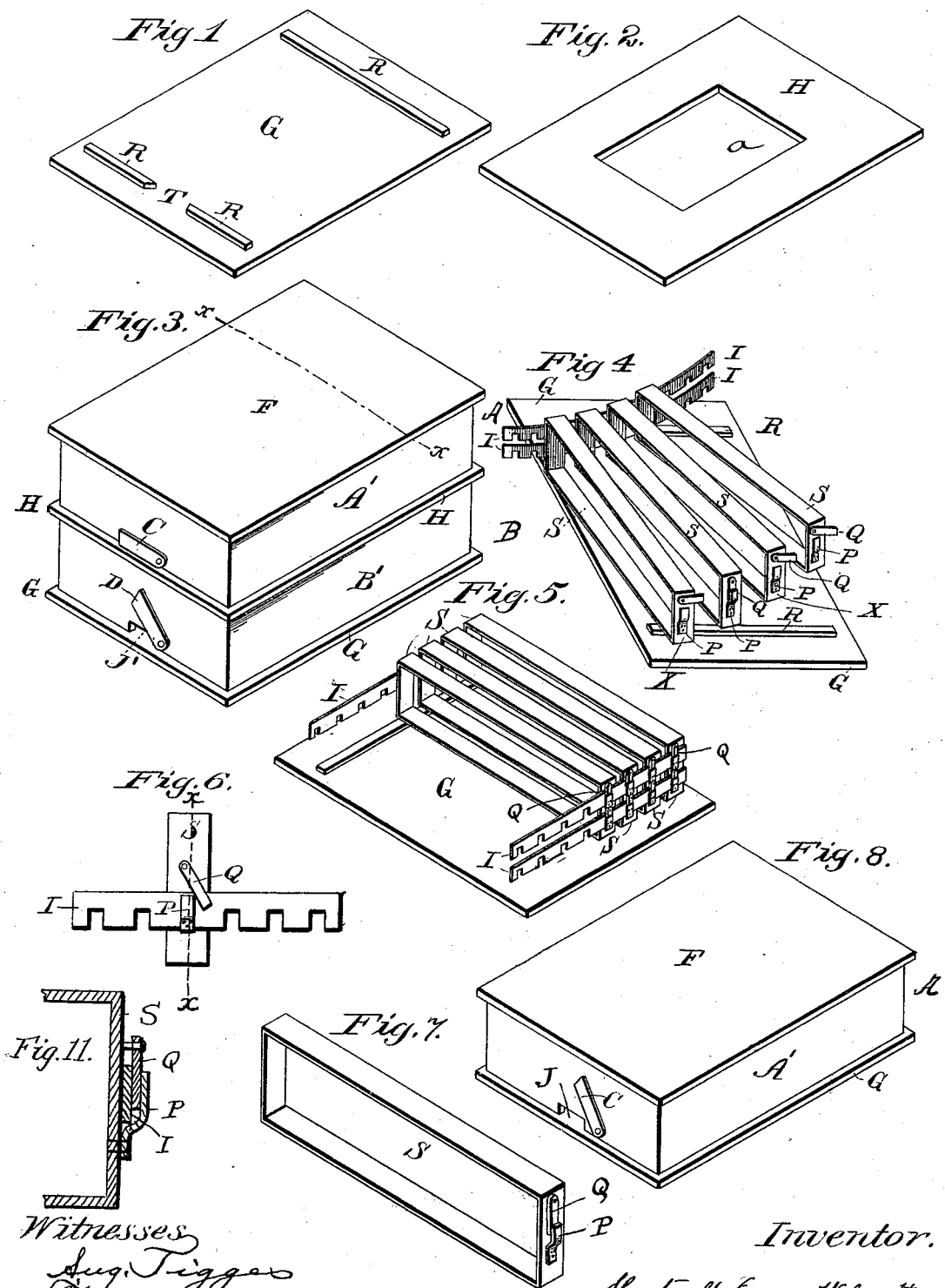
Witnesses
Aug. Tigges
Francis M. Beaudrean
Inventor
Hartwell Carver Wolworth (No Model.)
H. C. WOLWORTH.
BEEHIVE.
No. 510,751.
2 Sheets—Sheet 2.
Patented Dec. 12, 1893.
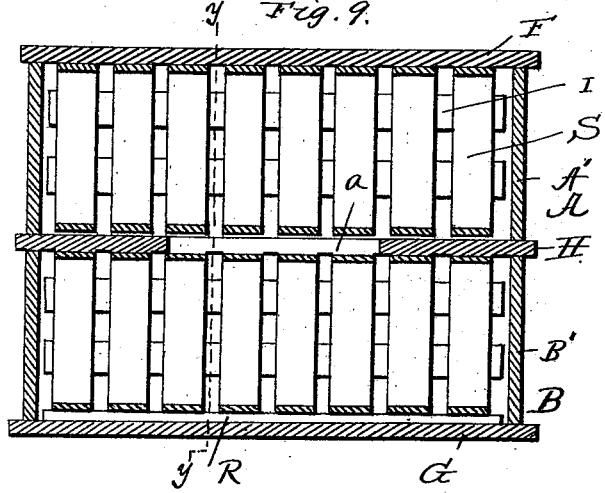
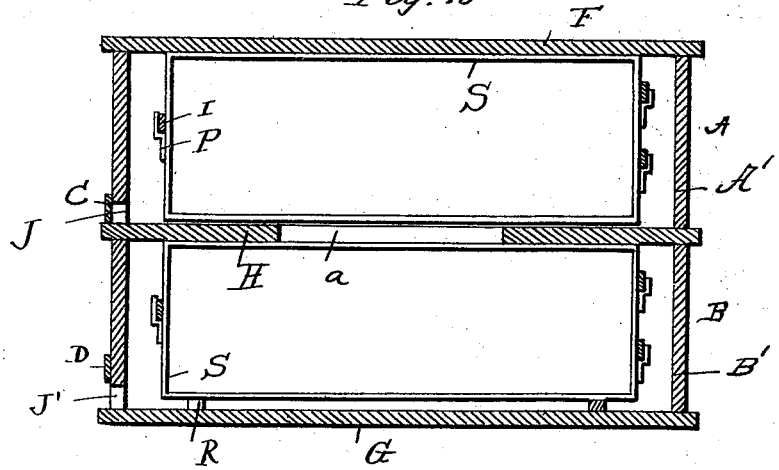
Witnesses:
Inventor
Hartwell C. Wolworth.
By James J. Sheehy
Attorney

UNITED STATES PATENT OFFICE.

HARTWELL CARVER WOLWORTH, OF DANCY, WISCONSIN.

BEEHIVE.

SPECIFICATION forming part of Letters Patent No. 510,751, dated December 12, 1893.

Application filed May 5, 1893. Serial No. 473,173. (No model.)

*To all whom it may concern:*

Be it known that I, HARTWELL CARVER WOLWORTH, a citizen of the United States, residing at Dancy, in the county of Marathon and State of Wisconsin, have invented certain new and useful Improvements in Beehives; and I do declare the following to be a full, clear, and exact description of the invention, such as will enable others skilled in the art to which it appertains to make and use the same.

My invention relates to improvements in beehives, and its novelty will be fully understood from the following description and claims when taken in connection with the annexed drawings, in which—

Figure 1, is a perspective view of the bottom of one of the hives. Fig. 2, is a similar view of the apertured division board which is placed between the two hives to permit the bees to pass from one to the other. Fig. 3, is a perspective view illustrating the arrangement of the hives when it is desired to divide the bees into two swarms. Fig. 4, is a perspective view of the bottom and a series of honey frames removed from a hive; the said frames being shown as moved to one side and separated in order to facilitate cleansing, the removal of dead bees, grubs, millers, &c. Fig. 5, is a perspective view of the bottom and honey frames with said frames in their normal operative position. Fig. 6, is an enlarged view illustrating the manner of attaching the connecting strips to the honey frames. Fig. 7, is a perspective view of one of the honey frames. Fig. 8, is a perspective view of one of the hives complete. Fig. 9, is a transverse section taken in the plane indicated by the line $x, x$, of Fig. 3. Fig. 10, is a longitudinal section taken in the plane indicated by the line $y, y$, of Fig. 9, and Fig. 11, is a section taken in the plane indicated by the line $x, x$, of Fig. 6, the turn button or tongue being illustrated in its operative position.

Referring by letter to said drawings: A, B, indicate two hives. These hives A, B, are preferably of the form shown and they comprise the chambers A', B', and are provided in the lower edge of one of their ends with openings J, J', controlled by doors C, D, for a purpose presently disclosed.

F, indicates the top of the hive A.

G, indicates the bottom which is used successively beneath the hive A, and the hive B; and H, indicates the division board which is placed between the hives A, B, and is provided with bee openings $a$, as shown, through which the bees may pass from one hive to the other.

As better shown in Fig. 1, of the drawings, the bottom G, is provided with two transverse bars R; the forward one of which is cut away as shown at T, so as not to interfere with the passage of the bees. These bars R, serve to support the honey frames S, so that the bees may readily pass beneath the same, and they also enable the attendant to readily remove the frames from the bottom G, when it is necessary, as will be presently described.

The honey frames S, are of rectangular form as shown, and they are detachably connected together by the strips I, which are formed from pliable material so that they may be readily bent. These strips I, may be connected to the frames S, in any approved manner, but I prefer in practice to notch the strips at intervals in their length and provide the ends of the frames S, with tongues P, to enter said notches as better shown in Figs. 6, and 11, of the drawings, whereby it will be seen that the said tongues will support the strips. I also prefer in practice to provide the frames S, with pivoted turn buttons or tongues Q, which are designed and adapted to rest between the fixed tongues P, and the strip I, as shown in Fig. 11, so as to prevent a casual disconnection of the said strip from the frames. By this construction, it will be readily perceived that the frames S, may be conveniently nested as shown in Fig. 5, and it will also be seen that when it is desired to clean the hive and remove dead bees, grubs, moldy combs, &c., the frames may be readily separated by simply swinging the tongues Q, upwardly and raising and removing the forward strip I, and spreading their forward ends apart; the strips I, being formed from pliable material as before described so that they will bend as shown and enable the frames to remain in their separated positions until they are nested or brought together by an attendant.

In the practice of my invention, I take advantage of the fact that bees, as a rule, will not swarm except when the hive is unclean or when it is overcrowded, and in carrying out my invention, I first permit the bees to occupy the hive A, illustrated in Fig. 8. This occupation of the hive A, may be effected by removing the top F, thereof, and placing the said hive beneath a full hive; a division board as H, being arranged between the full and empty hives, so as to permit passage of bees from one to the other. When the hive A, has received its quota or colony of bees, it is removed from the full hive and its top F, is placed in position as shown in Fig. 8, and it is let remain until the bees show signs of swarming. When the bees exhibit such signs and it is desired to prevent swarming, I remove the bottom G, and the full frames S, from the hive A, and place the hive B, and a bank of empty frames S, charged with foundation comb upon the said division board as shown in Figs. 3, 9, and 10. I then place the division board H, upon the hive B, and then the hive A, provided with the full combs upon said board, after which I close the openings J so as to prevent the bees from entering and leaving the hive A, except by the openings J'. Thus it will be seen that the bees in entering and leaving the upper hive A, are compelled to pass through the lower hive B, and being tempted by the cleanliness of said hive B, and the abundance of space therein, they will begin to occupy the same, and in the course of time will fill it as full as the hive A. When the two hives A, B are filled with brood and stores I remove the hive A, and the division board H, from the hive B, and I then provide the said hive B, with a cover F, such as shown in Fig. 8. This hive B, I let remain in its original place as it will be occupied by the old bees, who are accustomed with its situation. The hive A, which will be occupied by young bees, I provide with a bottom G, and move it a considerable distance from the hive B. If either of the swarms in the separated hives should have no queen there are always during the swarming season in a healthy swarm, queen cells from which young queens will come.

By reason of the construction of the hives, described, it will be seen that the attendant or bee farmer is enabled to control the swarming of the bees, and that he may prevent the swarming during the best part of the season, and thereby materially increase the yield of honey, which is a desideratum.

The honey frames S, herein described, are not designed to be placed on the market, but the honey therein is removed by extraction in the well known manner.

Having described my invention, what I claim is—

1. The combination with a plurality of honey frames; of a pliable strip, and means for connecting the said strip to the frames so as to permit of the frames being spread apart without being disconnected and returned to normal position, substantially as and for the purpose set forth.

2. The combination with a plurality of honey frames, having fixed tongues at their ends; of a strip formed from pliable material and having the notches adapted to engage the fixed tongues of the said frames, so as to connect them together, substantially as specified.

3. The combination with a plurality of honey frames; of pliable strips and means for detachably connecting the same to the said frames at the opposite ends thereof, substantially as and for the purpose set forth.

4. The combination with a plurality of honey frames, having fixed tongues and also having turn buttons at their opposite ends; of pliable strips having notches adapted to receive the fixed tongues of the honey frames; the said strips being also adapted to be engaged by the turn buttons, thereof, substantially as specified.

HARTWELL CARVER WOLWORTH.

Witnesses:
GEO. A. DELAP,
HUGH O. BEADLE.